US008407312B2

(12) United States Patent
Shimazaki

(10) Patent No.: US 8,407,312 B2
(45) Date of Patent: Mar. 26, 2013

(54) DATA DELIVERY APPARATUS

(75) Inventor: Kenji Shimazaki, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 49 days.

(21) Appl. No.: 13/021,360

(22) Filed: Feb. 4, 2011

(65) Prior Publication Data

US 2011/0302271 A1 Dec. 8, 2011

(30) Foreign Application Priority Data

Jun. 8, 2010 (JP) ................................ 2010-130621

(51) Int. Cl.
*G06F 15/16* (2006.01)

(52) U.S. Cl. .................. 709/217; 709/231; 709/246

(58) Field of Classification Search .............. 709/246, 709/231, 217; 370/401; 725/89
See application file for complete search history.

(56) References Cited

U.S. PATENT DOCUMENTS

| | | | | |
|---|---|---|---|---|
| 2002/0143977 A1* | 10/2002 | Togashi | .............. | 709/231 |
| 2003/0023756 A1* | 1/2003 | Awamoto et al. | ............. | 709/246 |
| 2005/0232284 A1* | 10/2005 | Karaoguz et al. | ............. | 370/401 |
| 2006/0150224 A1* | 7/2006 | Kamariotis | ............. | 725/89 |
| 2006/0230169 A1* | 10/2006 | Kaplan et al. | ............. | 709/231 |
| 2007/0079010 A1* | 4/2007 | Heredia et al. | ............. | 709/246 |
| 2009/0070840 A1 | 3/2009 | Kamimaki et al. | | |
| 2010/0049864 A1* | 2/2010 | Lu et al. | ............. | 709/231 |

FOREIGN PATENT DOCUMENTS

| JP | 2007-006148 | 1/2007 |
|---|---|---|
| JP | A 2009-065305 | 3/2009 |

* cited by examiner

*Primary Examiner* — Jungwon Chang
(74) *Attorney, Agent, or Firm* — Foley & Lardner LLP

(57) ABSTRACT

The problem to be solved by the invention is to deliver the contents corresponding to the same master content to a plurality of terminals having different display functions, without beforehand preparing a plurality of contents of different protocols (formats) depending on the display functions, respectively. A data delivery apparatus according to the invention converts master content information into respective converted contents by using conversion parameter information selected based on information notified from respective terminals.

9 Claims, 4 Drawing Sheets

DATA DELIVERY APPARATUS

INCORPORATION BY REFERENCE

The present application claims priority from Japanese application JP 2010-130621 filed on Jun. 8, 2010, the content of which is hereby incorporated by reference into this application.

BACKGROUND OF THE INVENTION

The present invention relates to a data delivery apparatus to deliver contents such as a video, and in particular, to a data delivery apparatus to make the contents viewed in a plurality of terminals via a network.

Regarding a system to view contents such as a video, for example, JPA-2009-065305 describes that it is an object "to provide the technology suitable to provide a seamless viewing style at any locations by using a mobile terminal and an information receiving terminal having a large screen." Further, to achieve the object, the information receiving terminal comprises a unit to transmit mobile video information to the mobile terminal, and the video information system is configured to control a viewing environment to satisfy requirements of two or more users. By transmitting from terminals to the center the time code information for the mobile terminal to continue viewing contents which the information receiving terminal has been viewing, the video information system allows the mobile terminal to receive and to continue viewing the contents. On the contrary, the video information system allows the information receiving terminal to continue viewing contents which the mobile terminal has been viewing.

SUMMARY OF THE INVENTION

However, in JP-A-2009-065305, it is assumed that contents to be viewed are beforehand stored in the delivery apparatus, and it is not taken into consideration to control the viewing of real time streaming contents.

Further, in the case of delivering contents to terminals of different display function specifications, when a terminal issues a viewing request of a content, the content is selected depending on the display function specification of the terminal, and transmitted. Hence, to cope with the display function specifications of the terminals, it was necessary to prepare contents of the respective protocols (formats), although the contents correspond to the same master content.

A data delivery apparatus according to the present invention comprises, for example, a receiving section to receive a delivery request from a terminal, a conversion parameter storing section having conversion parameter information to convert master content information depending on a display function of the terminal, a content conversion processing section to convert the master content information into a converted content by using the conversion parameter information selected based on the delivery request, and a transmitting section to transmit the converted content to the terminal.

As a result of the present invention, it has become unnecessary to beforehand prepare a plurality of contents of different protocols (formats) depending on the display functions of terminals respectively, which makes it easy to manage the contents. Also, without restriction based on the difference of protocols (formats), contents can be delivered to terminals having different display functions.

Other objects, features and advantages of the invention will become apparent from the following description of the embodiments of the invention taken in conjunction with the accompanying drawings.

DESCRIPTION OF THE EMBODIMENTS

In an example of an embodiment according to the present invention, a data delivery apparatus comprises a function to manage and to convert contents containing a video stream (master content information) which have sufficiently high quality and a high frame rate and which can be converted into another format, and a function to obtain, from a delivery request from a terminal, information regarding a display function of the terminal, wherein, when receiving a delivery request from a terminal, the data delivery apparatus converts the master content information into a format suitable for the display function of the terminal and then transmits the converted content to the terminal.

Description will now be given of the example of an embodiment of the present invention by referring to the accompanying drawings. However, the present invention is not restricted to the embodiment. The embodiment is a system comprising a television (TV) set, a personal computer (PC), a mobile information terminal, and a content delivery apparatus which are linked via a network with each other.

Figure 1:
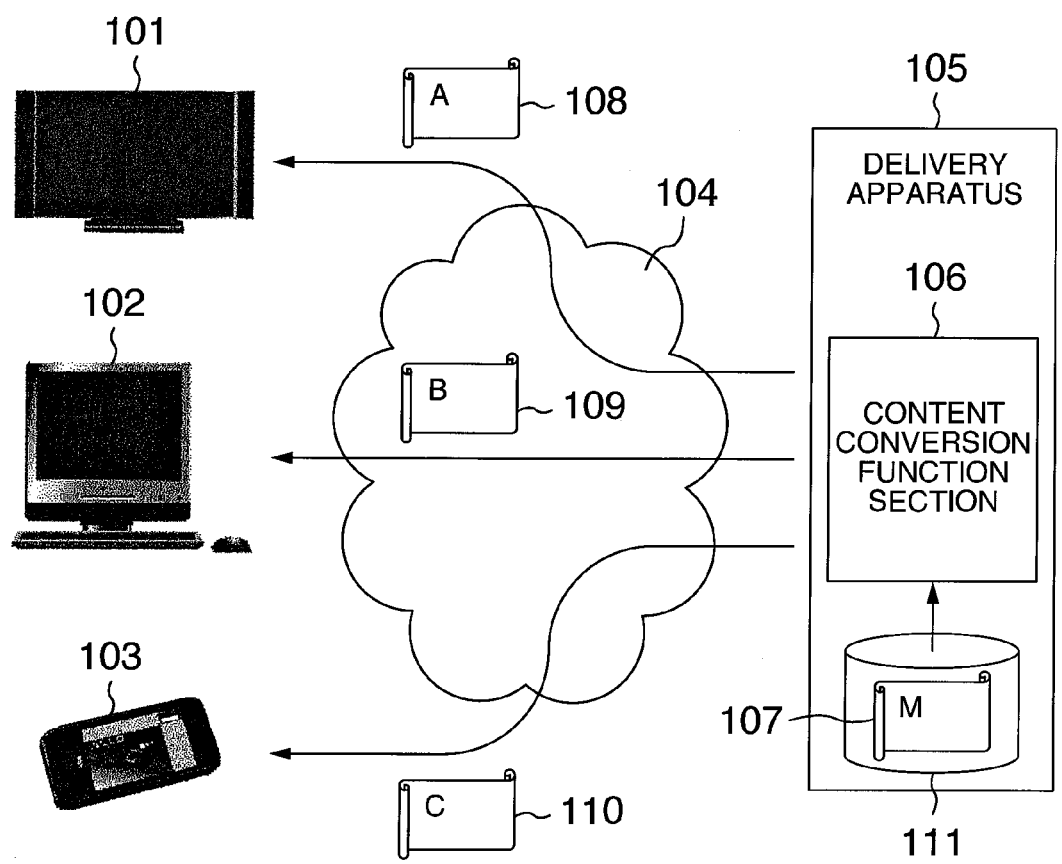
FIG. 1 shows a configuration example of a video delivery system for terminals having different display functions.

FIG. 1 shows a configuration example of a video delivery system for terminals having different display functions according to the embodiment. It will be described how contents corresponding to the same master content are reproduced by terminals having different display functions, the TV set 101, the personal computer 102, and the mobile information terminal 103 which are linked via a network 104 with each other. Meanwhile, the TV set 101, the personal computer 102, and the mobile information terminal 103 will be collectively referred to as "receiving terminals".

The contents are transmitted from the delivery apparatus 105 via the network 104 to the respective receiving terminals. The content having picture quality suitable for reproduction by the TV set 101 is a TV content A 108. Similarly, the content having picture quality suitable for reproduction by the personal computer 102 is a PC content B 109, and the content having picture quality suitable for reproduction by the mobile information terminal 103 is a mobile terminal content C 110. These contents are data depending on protocols (formats) of the display functions of the associated receiving terminals, respectively.

The delivery apparatus 105 also has a master content (master content information) M 107 and a content conversion function section 106. When receiving a delivery request of a content from a receiving terminal, the delivery apparatus reads an associated master content M 107 from a content database section 111 depending on the display function information of the receiving terminal contained in the delivery request. The content conversion function section 106 converts the master content M 107 into one of the contents A 108 to C 110 whose format is suitable for reproduction by the receiving terminal.

Meanwhile, the master content M 107 may be a video file beforehand stored in the content database section 111 as shown in FIG. 1 or streaming data which is being taken with a video camera or the like.

The format suitable for reproduction by the receiving terminal is, for example, as follows:

For the TV content A 108, H.264 whose picture quality is equivalent to that of the master content M 107;

For the PC content B 109, AVI which is narrower in the angle of view and is lower in resolution compared with the TV content A 108;

For the mobile terminal content C 110, MPEG4 which is further lower in resolution and in the frame rate compared with the PC content B 109; and so on. Namely, the format is adjusted in at least any of picture quality, resolution, and the compression ratio of the master content depending on the display function (reproduction function) of the receiving terminal, and implemented by the conversion using conversion parameter information, which will be described later.

Figure 2:
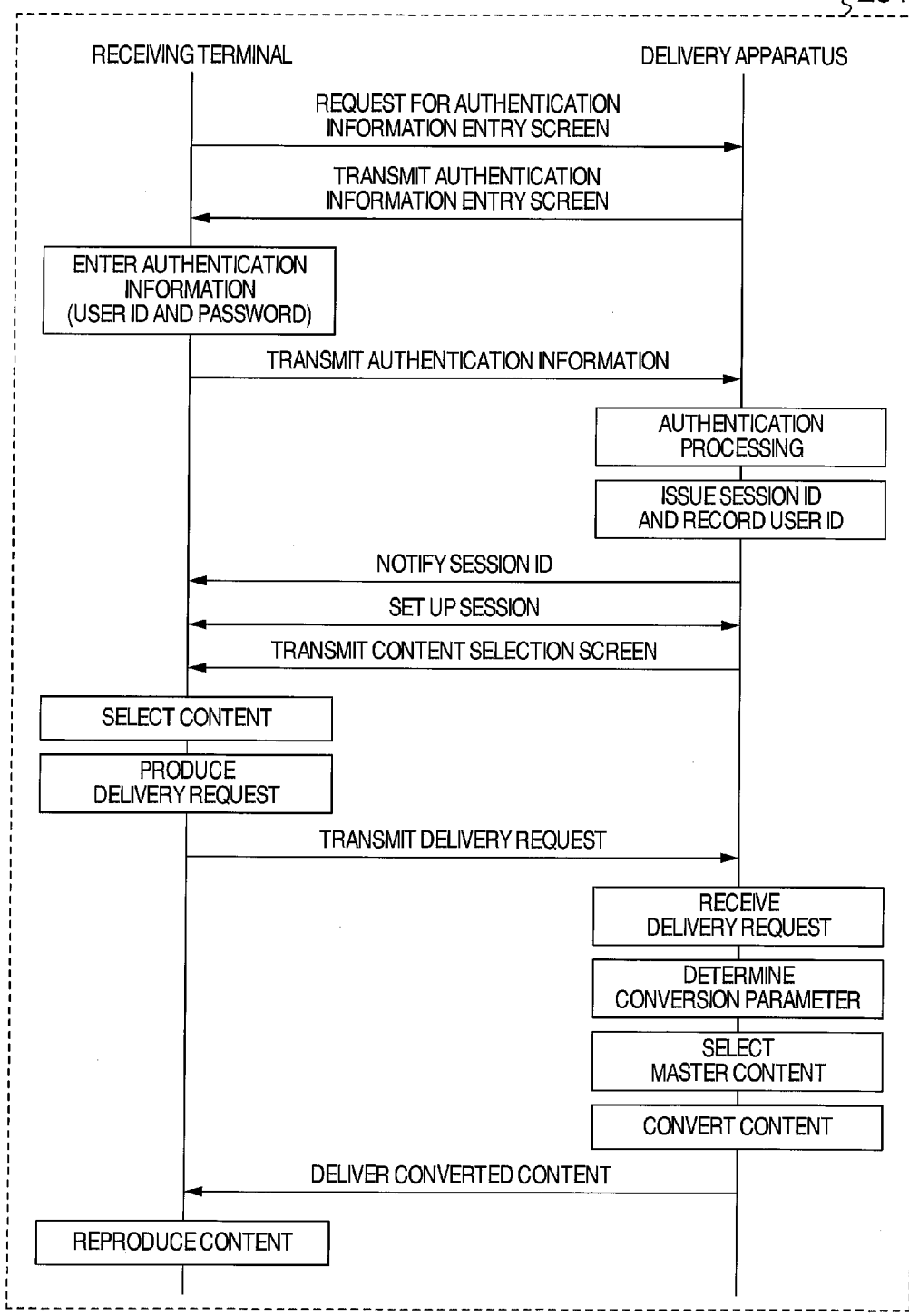
FIG. 2 shows a delivery sequence example.

FIG. 2 shows an example of a delivery sequence 201. When a receiving terminal transmits a request for an authentication information entry screen to the delivery apparatus, the delivery apparatus transmits the authentication information entry screen to the receiving terminal. When entering authentication information containing a user identification (ID) and a password in the authentication information entry screen, the receiving terminal transmits them to the delivery apparatus, and then the delivery apparatus executes authentication processing. Thereafter, the delivery apparatus issues a session ID and then records the session ID and the user ID in a session management table. The delivery apparatus notifies the session ID to the receiving terminal to thereby set up a session. After setting up the session, the delivery apparatus transmits a content selection screen to the receiving terminal. Here, when the user selects a content, for example, by depressing a link in the content selection screen displayed on the receiving terminal, the receiving terminal produces and transmits a delivery request to the delivery apparatus based on the user's operation. The delivery request includes information to determine a type of the data format which the receiving terminal can process (terminal information) as well as the user ID and the content ID. The delivery apparatus reads the terminal information from the delivery request and determines a conversion parameter based on the terminal information. The delivery apparatus selects a master content to be delivered and converts the master content by using the conversion parameter into the format corresponding to the terminal information to produce a converted content for delivery. Meanwhile, for the conversion, the content conversion function section 106 stores therein conversion information (conversion parameter information) used to adjusts the picture quality, resolution, compression ratio and the like of the master content to thereby convert the master content into the converted content in the format corresponding to the terminal information. The delivery apparatus then delivers the converted content to the receiving terminal which has transmitted the delivery request. This enables the receiving terminal to receive the converted content in the format depending on the terminal type and to reproduce and display the converted content.

Here, the content conversion may be conducted each time a delivery request is received from a receiving terminal. In association with the reproduction of a content, the receiving terminal may also transmit a reproduction position information as log information to the delivery apparatus. In this case, the delivery apparatus records the reproduction position information received by a receiving section, in the session management table with a corresponding session ID information, user ID information and content ID information. Hence, in the case where the reproduction of the content is suspended, it is possible for the delivery apparatus to control to reproduce the content from the suspension position of the reproduction by searching the session management table by using, as a key, the user ID contained in the delivery request, even if the delivery request is again transmitted from not only the original receiving terminal but also another type of receiving terminal.

Figure 3:
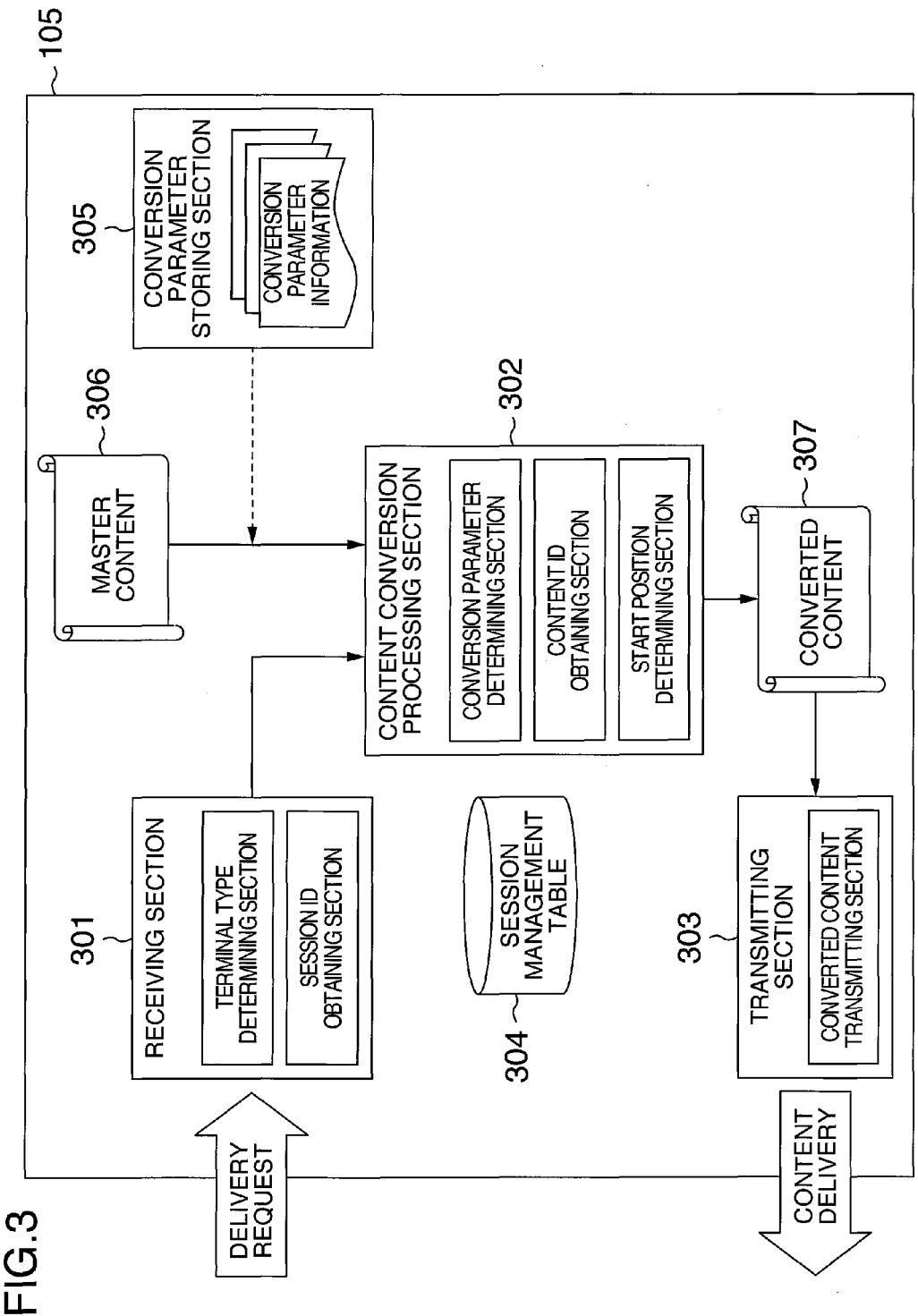
FIG. 3 shows functional blocks of a delivery apparatus.

FIG. 3 shows functional blocks of the delivery apparatus 105. The delivery apparatus 105 comprises a receiving section 301 to receive a delivery request for video from a receiving terminal, a content conversion processing section 302 to convert a master content into a format suitable for reproduction by the receiving terminal, and a transmitting section 303 to transmit the converted content to the receiving terminal.

The receiving section 301 comprises a determining section to refer to the terminal information contained in the delivery request from the receiving terminal to determine a type of the receiving terminal, and a session ID obtaining section to obtain a session ID. The session ID is determined during session setup processing, which is executed before the content delivery request, and is managed by the delivery apparatus 105. The session ID is contained as a parameter in the delivery request from the receiving terminal. If Cookie is available, it may be used. In the delivery apparatus 105, a conversion parameter storing section 305 is arranged to store therein conversion parameter information which defines, for each type of the receiving terminals or each protocol depending on the receiving terminals, how to convert the master content depending on the display function of the receiving terminal. For example, the following methods are considered as a method to determine the type of the terminal based on the delivery request: a method to use a User-Agent character string contained in the delivery request; or a method to use a terminal unique ID recorded in the receiving terminal. The delivery apparatus 105 also has a session management table 304. The session management table 304 stores therein user ID information of a receiving terminal associated with a delivery request, session ID information associated with the delivery request, content ID information of a master content corresponding to a content to be reproduced, and reproduction position information of content data being reproduced as well as the correspondence relation among them. The session management table 304 keeps the content ID of the master content corresponding to a content which is being reproduced or which is to be reproduced by the receiving terminal.

In the content conversion processing section 302, a conversion parameter determining section selects, from the conversion parameter storing section 305, conversion parameter information based on the terminal type which is a result determined by the terminal type determining section of the receiving section 301. In this case, the conversion parameter storing section 305 stores therein a plurality of different conversion parameter information so that when receiving delivery requests from a plurality of receiving terminals, the content conversion processing section 302 can cope with a plurality of different protocols of the receiving terminals. Then, a content ID obtaining section searches the session management table 304 by using, as a key, the session ID obtained by the receiving section 301, to thereby obtain the content ID. Based on the content ID, the content conversion processing section 302 selects an associated master content 306. Next to the above processing, the content conversion processing section 302 converts the master content 306 into the format corresponding to the display function of the receiving terminal to produce a converted content 307. Also, a start position determining section determines a reproduction start position of the content and records the reproduction start position in the session management table 304.

The transmitting section 303 transmits the converted content 307 produced by the content conversion processing to the receiving terminal.

Figure 4:
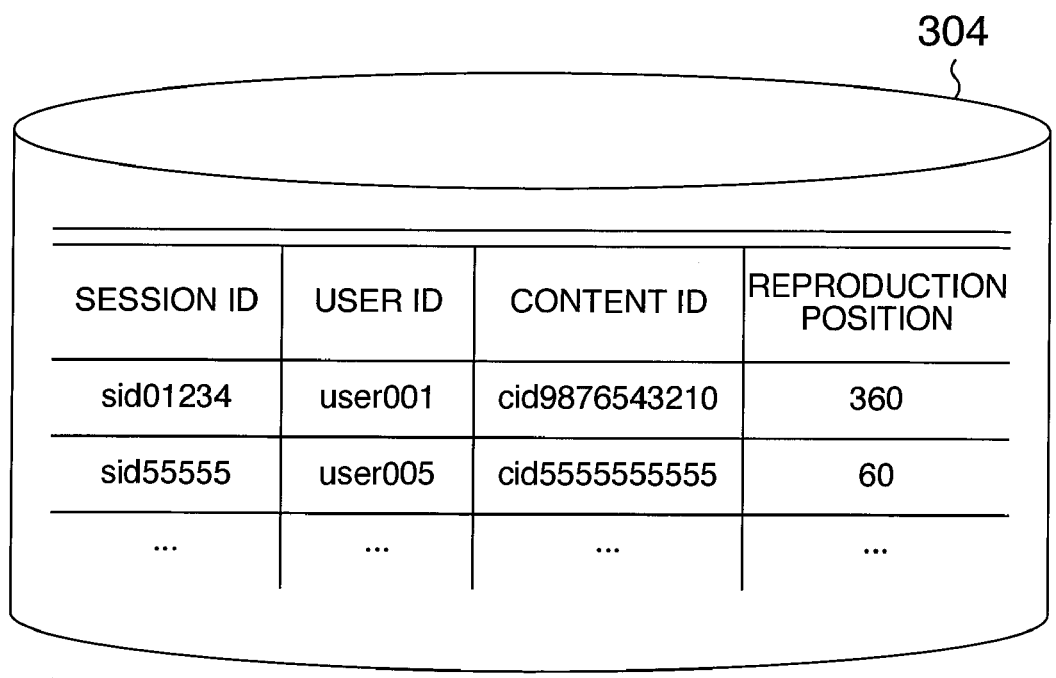
FIG. 4 shows an example of a session management table.

FIG. 4 shows an example of the session management table. The session management table 304 includes session ID information, user ID information, content ID information, and reproduction position information, etc. Hence, the information obtained by the receiving section 301 makes it possible to specify a content ID of the master content corresponding to the content to be transmitted.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A data delivery apparatus, comprising:
   a receiving section configured to receive a first delivery request from one terminal of a plurality of terminals corresponding to one user ID;
   a conversion parameter storing section having therein conversion parameter information to convert master content information depending on a display function of the plurality of terminals;
   a content conversion processing section configured to convert the master content information into a first converted content, by using the conversion parameter information selected based on terminal information contained in the first delivery request for determining a type of the data format which the one terminal can process;
   a session management table configured to record therein a user ID information corresponding to the plurality of terminals, a session ID information set when executing authentication of the one terminal and recorded with the user ID information, a content ID information contained in the delivery request, and reproduction position information received from the one terminal as well as the correspondence relation among them; and
   a transmitting section configured to transmit the converted content to the terminal,
   wherein, when receiving a second delivery request from the one terminal or another terminal of the plurality of terminals, the delivery apparatus is configured to search the reproduction position information corresponding to the user ID information from the session management table based on the user ID information contained in the second delivery request to transmit from the transmitting section to said one terminal or another terminal which has transmitted the second delivery request either of the first converted content or a second converted content, the content conversion processing section is configured to convert the master content information into the second converted content based on the terminal information contained in the second delivery request, so that it can be reproduced from a suspension position of the reproduction based on the reproduction position information.

2. A data delivery apparatus according to claim 1, wherein the conversion parameter storing section has a plurality of different conversion parameter information corresponding to the plurality of terminals, respectively.

3. A data delivery apparatus according to claim 1, wherein the content conversion processing section is configured to adjust, by using the conversion parameter information, at least any of picture quality, resolution, and a compression ratio of the master content information to thereby convert the master content information into the first converted content.

4. A data delivery apparatus according to claim 1, wherein the content conversion processing section is configured to search, based on session ID information contained in the delivery request, corresponding content ID information, to thereby select the master content information.

5. A data delivery apparatus according to claim 1, wherein the terminal information is terminal type information of the terminal.

6. A data delivery apparatus according to claim 1, wherein the terminal information is type information of a protocol which the terminal can process.

7. A data delivery apparatus according to claim 1, wherein the terminal information is a User-Agent character string or a terminal unique ID.

8. A data delivery apparatus according to claim 1, wherein the content conversion processing section is configured to convert the master content information each time the first or second delivery request is received.

9. A data delivery apparatus according to claim 1, further comprising a content database section configured to store therein the master content information.

* * * * *